May 2, 1967  W. O. WEBER  3,317,363
CORRUGATED PRODUCT
Filed Nov. 29, 1963

INVENTOR
WALTER O. WEBER
BY Cushman, Darby & Cushman
ATTORNEYS

Уnited States Patent Office 3,317,363
Patented May 2, 1967

3,317,363
CORRUGATED PRODUCT
Walter O. Weber, Wilmington, Del., assignor to Haveg Industries, Inc., a wholly-owned subsidiary of Hercules Powder Company, New Castle, Del., a corporation of Delaware
Filed Nov. 29, 1963, Ser. No. 326,815
7 Claims. (Cl. 156—210)

ABSTRACT OF THE DISCLOSURE

A foamable thermoplastic resin is extruded in the form of a sheet and the surfaces of the sheet are chilled during the foaming so that there is formed a sheet having non-porous, unfoamed skins integral with a foamed core. This sheet is then corrugated in a direction parallel to the extrusion, e.g., by corrugating rolls. Flat panels are then applied to the peaks and low points of the corrugated sheet to form a sandwich.

This invention relates to the formation of a corrugated product.

Normally it is difficult to form corrugations in a soft, thermoplastic extruded foam sheet becouse such a sheet has little tensile strength and when subjected to drawing tends to yield at the weakest point and develop holes or tears. Additionally, it is difficult to form strong laminates to flat sheets to form a corrugated sandwich because the foam does not have a flat continuous surface.

It is an object of the present invention to form improved sandwiches of a corrugated foam between two sheets of materials.

Another object is to provide a flat panel cover to at least one side of a corrugated thermoplastic foam sheet.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by continuously extruding a foamed thermoplastic resin sheet, forming at least one, and preferably two, unfoamed skins on the sheet, converting the sheet into a corrugated panel and laminating a flat panel to at least one side, and preferably both sides, of the corrugated panel.

The corrugated panel produced is unstressed.

The skin or skins are formed by rapidly chilling one or both surfaces of the sheet shortly after it comes out of the extruder while not chilling the major portion of the sheet, whereby it continues to expand to form the foam. As the sheet emerges from the extruder die corrugations are initiated longitudinally by controlling the degree of lateral expansion of the sheet. After chilling the surfaces of the sheet to form the skin the corrugations are accentuated and controlled in terms of amplitude and pitch to form a corrugated panel by passing through corrugated dies. The panel corrugation is set by chilling the corrugated dies.

Despite this chilling the skin surfaces normally are still warm enough to have sufficient tack to stick to a flat panel and form a sandwich construction, the outer layers being flat or sheeted material and the inner layer being the skinned corrugated foam. If the corrugated panel is cooled sufficiently that it is no longer tacky then it can be bonded to the flat sheets either by a quick reheating of the corrugations, e.g. with radiant heaters to develop surface tack or an adhesive can be applied to the peaks to bond the flat panels.

The flat panels can be made of the same material as the corrugated panel, i.e., a skinned foamed thermoplastic resin or they can be of any other material, e.g., exploded wood fiber boards such as patterned Masonite for example, or gypsum board or transite, or wood, metal, e.g., steel or aluminum, or unfoamed plastic, e.g., polystyrene, polymeric olefins such as polyethylene and polypropylene, polyvinyl chloride, melamine-formaldehyde, urea-formaldehyde, phenol-formaldehyde, polyesters, e.g. polyethylene terephthalate and styrene modified polyethylene glycol-polypropylene glycol-adipatemaleate.

The products of the invention can be used to replace corrugated paper in the box industry and have the advantages of being a better moisture barrier and having higher strength and insulative properties. In the building panel field they can be used for interior and exterior paneling. They can also be used with indirect lighting in the corrugations for ceiling panels. For mere insulation, cheap insulation material can be employed to fill the corrugations. The corrugated panel sandwiches of the present invention are lightweight and low cost yet maintain their structural integrity.

The corrugated panel as stated is made from a skinned foamed sheet which preferably consists of (1) a moderate to high density uniform foam, thermoplastic resin core, (2) a non-porous, tough, thermoplastic resin outer skin, and (3) a non-porous, tough, thermoplastic resin inner skin, said core comprising 50 to 96% of the total thickness of the skins and core, said core being integrally united to said skins. When two skins are employed they can be of the same thickness or one can be thicker than the other, e.g., 2 to 5 times as thick.

It is also desirable that the foam have a density between 5 and 45 lbs./cu. ft., preferably between 12 and 35 lbs./cu. ft. The skins are essentially unexpanded and have a considerably higher density than the foamed core, e.g., they can have a density of 60 to 66 lbs./cu. ft. with material having a density of 66 lbs./cu. ft. The foam has a density of 7.5 to 75% of the density of the unfoamed polymer preferably 18 to 50% of such density.

Various polymers can be used to form the foamed plastic.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

The foamable thermoplastic resins which can be extruded according to the invention include chlorinated rubber, cellulose ethers and esters, e.g., ethyl cellulose, cellulose acetate, cellulose acetatebutyrate, bituminous materials, e.g., asphalt and coal tar pitch, paraffin wax, homopolymers and interpolymers of monomeric compounds containing the $CH_2=C<$ grouping, such as olefins, e.g., ethylene, propylene, isobutylene, butene-1, vinyl halides, e.g., vinyl chloride; vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above-mentioned vinylidene monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively nonelastic, thermoplastic resins such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Other suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5) polyurethanes, e.g., from toluene diisocyanate and polypropylene glycol molecular weight 2025; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer) as well as other terpolymers containing 25–60% butadiene, 10–20% acrylonitrile and 20 to 60% styrene.

The invention is of particular value with foams from polyethylene (of high density, e.g., 0.960, medium density, e.g., 0.935 or low density, e.g., 0.914), polypropylene, copolymers of ethylene and propylene (e.g., 50–50 copolymer) and regular or high impact polystyrene. Copolymers of ethylene with butene-1 (e.g., 90:10) also can be employed.

To insure the formation of a uniform foamed plastic core a nucleating agent should be used in forming the foamed sheet.

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecular, alkylphenolalkylene oxide adducts, et.g., Triton X–100 (t-octylphenolethylene oxide adduct having 10 ethylene oxide units in the molecule), sodium lauryl sulfate and sodium dodecylbenzene sulfonate. The wetting agent can be nonionic or anionic.

The preferred mode of incorporating the foaming agent into the polymer is by premixing the pelletized, solid, thermoplastic polymer, e.g., high impact styrene polymer, with a minor amount of an absorbent having absorbed thereon a volatile liquid (i.e., the foaming agent) which is non-reactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of those hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

The foamed sheet is formed by extruding a hot sheet of foamable thermoplastic resin composition, rapidly chilling the outer and inner surfaces only of the sheet to prevent expansion thereof and to form outer and inner skins while permitting the still warm core of the sheet to expand. The chilling can be done with an air blast, an air-water mist, argon, helium or other inert fluid. The exact temperature and velocity of the fluid is not critical. Room temperature and a fluid flow of 40 to 100 ft./sec. are normally used since they can be obtained conveniently, although other temperatures, e.g., 0 to 100° F., and velocities can be used. The fluid, e.g., air, temperature and velocity are controlled so as to cool just a skin, i.e., about 3 to 25% of the thickness at the top of the sheet and about 3 to 25% of the thickness at the bottom of the sheet. Preferably, each skin is not over 15% of the sheet thickness.

The sheet is then passed through the corrugated die which also is preferably cooled by a fluid, e.g., with tap water, e.g., to maintain the roll at 60 to 100° F. and to insure that the final foamed core temperature after forming is not over 200° F. (when using styrene polymers).

The corrugated panel can have a total thickness of 10 mils up to 300 mils or more, e.g., 1000 mils. In producing the corrugated panels the pitch is usually ½, 1, 2 or 3 inches and, in fact, can be either higher or lower than these values. The amplitude (depth) can be either the same, greater than or less than the pitch. Thus, the amplitude can be from ⅛ the pitch to 3 times the pitch.

The invention will be understood best in connection with the accompanying drawings wherein.

Figure 1:
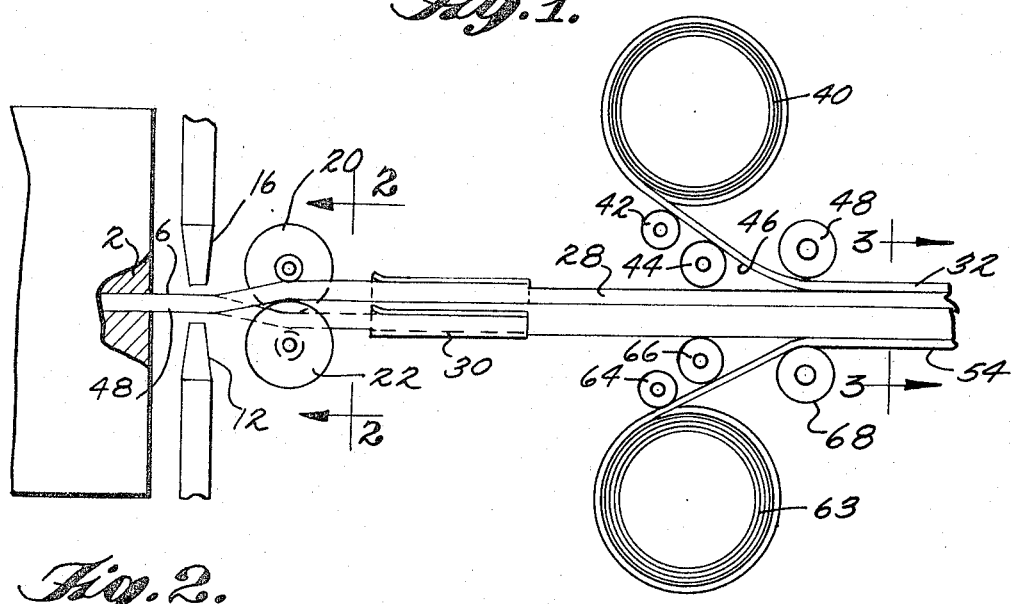
FIGURE 1 illustrates in schematic fashion one means for carrying out the invention.
Figure 2:
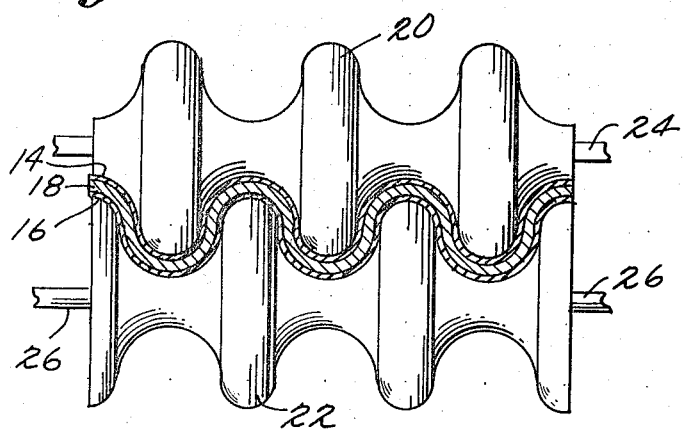
FIGURE 2 is a view taken along the line 2—2 of FIGURE 1.

Referring more specifically to FIGURE 1 of the drawings there is provided a high impact polystyrene, specifically polystyrene modified with 5% polybutadiene (Foster Grant's Tuflex 216). 100 parts of the high impact polystyrene was mixed with 2 parts of Celite having pentane absorbed thereon. (There was 1 part of pentane and 1 part of Celite to make up the total of 2 parts). There was also mixed with the high impact polystyrene 0.5 parts of Bayol 35, 0.3 part of powdered anhydrous citric acid and 0.4 part of powdered sodium bicarbonate.

This mixture is then extruded at conventional temperatures for extruding the polymer, e.g., temperatures between 270° and 375° for polystyrene.

In the specific example the mixture just set forth was extruded from extrusion die 2 in the form of a sheet 4 at an extrusion melt temperature of 465° F., a sheet speed of 4 ft./min. and a sheet width of 30 inches.

Substantially immediately thereafter the upper surface 6 and the lower surface 8 of the sheet were blasted uniformly with air at room temperature (70° F.) and 80 ft./sec. from nozzles 10 and 12. As the result of the air blasts upper and lower non-porous, unfoamed tough skins 14 and 16 are formed while at the same time a foamed expanded core 18 unaffected by the air blasts and integrally united to the skins is also formed.

The sheet then goes to the mating corrugated rolls 20 and 22 which are maintained between 70 and 100° F., usually about 85° F., by cooling with tap water passed through pipes 24 and 26. The corrugated rolls are set to form a corrugated panel 28 out of the sheet 4 in which the corrugations have an amplitude of 1.5 inches and a pitch of 1 inch. The corrugated sheet had a density of 25 lbs./cu. ft., a total thickness of 125 mils composed of 10-mil thick upper and lower skins 14 and 16 and 105-mil thick cover 18.

If additional cooling is desired the corrugated sheet 28 can be passed through a corrugated sheet metal die 30 internally cooled with tap water. Normally, however, such extra cooling is not required.

Figure 3:
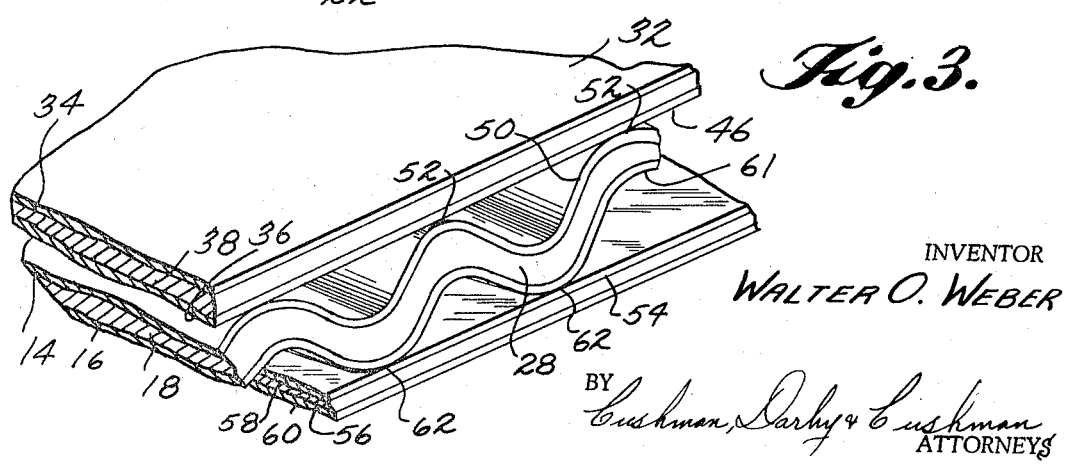
FIGURE 3 is a view taken along the line 3—3 of FIGURE 1 and shows a sandwich construction according to the invention.

While the skin surfaces 14 and 16 of the corrugated panel 28 are still tacky there is applied to the upper surface 14 a flat panel 32 made of the same foamed polystyrene material. The flat panel 32 is 60 mils thick, has a 5-mil thick upper, unfoamed, non-porous, tough skin 34, a 5-mil thick lower, unfoamed, non-porous, tough skin 36 and a 50-mil thick foamed core 38 integrally united to the skins. The flat panel 32 has a density of 25 lbs./cu. ft. and was formed in a manner similar to that just described but omitting the corrugating rolls. The flat panel 32 is continuously fed off stock roll 40, passes over heated rolls 42 and 44 and then to the top of the corrugated panel 28. Heated roll 44 insures that the top surface of panel 28 is in tacky condition when flat panel 32 meets it. While it is not necessary that the bottom surface 46 of panel 32 also be tacky, it is frequently desirable to impart sufficient heat through rolls 42 and 44 to the bottom surface 46 to also render it tacky. The panel 32 passes under pressure roll 48 which insures the union or lamination of the upper surface 50 of the corrugated panel 28 with the lower surface 46 of the flat panel 32. As can be seen from FIGURE 3 the lamination occurs only at the peaks 52 of the corrugated panel.

To complete the sandwich in similar fashion a foamed polystyrene flat panel 54 identical with panel 32 and comprising a foamed core 56 integrally united to non-porous, unfoamed, tough upper and lower skins 58 and 60 is laminated to the lower surface 61 of the corrugated panel 32 at the low points 62 thereof. The flat panel 54 is fed from stock roll 63 under heated rolls 64 and 66 and then over pressure roll 68 to complete the formation of the sandwich.

In place of using heated rolls 42, 44, 64 and 66 the necessary heat to render the surfaces 50 and 61 tacky can be imparted by a radiant heater which reheats such surfaces briefly to 350° F., for example. The surfaces are then allowed to cool to destroy the tack in the skin surfaces.

Alternatively, in place of rendering the surfaces 50 and 61 tacky there can be used an adhesive to form the lamination. Thus, rolls 42 and 64 in such case would be merely guide rolls and rolls 44 and 66 would be applicator rolls. As an example of a suitable adhesive there could be used an epoxy resin, e.g., a bisphenol A-epichlorhydrin resin such as Epon 834. The adhesive can be used not only to laminate a flat foamed thermoplastic resin panel to the corrugated panel 32 but also can be used to laminate other flat panels made out of other materials, e.g., wood, aluminum, steel, copper, glass, exploded wood fibers, unfoamed resin sheets, e.g., of polyvinyl chloride, polyethylene, polypropylene, melamine-formaldehyde, resin bonded wood flour (e.g., phenol-formaldehyde or melamine-formaldehyde or urea-formaldehyde bonded wood flour panels), paper, cardboard or polyester bonded glass fibers (e.g., using 40% styrene modified polyethylene glycol-polypropylene glycol-adipate-maleate).

Of course, other adhesives can be used such as styrene glues, casein glues, urea-formaldehyde glue, resorcinol-formaldehyde adhesive, melamine-formaldehyde adhesive.

While the drawings illustrate the formation of a sandwich it is also within the scope of the invention to merely unite a single flat panel to the corrugated panel. This can be accomplished, for example, simply by omitting the stock roll 63, rolls 64 and 66 and panel 54 in the process illustrated in FIGURE 1.

What is claimed is:
1. A method of forming a corrugated board with a cor- rugated core of foamed, thermoplastic resin having integral non-foamed skins on both surfaces and surfacing planar sheets comprising extruding a sheet of foamed thermoplastic resin, chilling both the top and bottom portions of said sheet prior to corrugation to form non-porous, unfoamed skins integral with the foamed core, corrugating said sheet in a direction parallel to the extrusion direction whereby peaks and low points are formed in the sheet and adhering surfacing panels to the skin surface of both the peaks and low points of said corrugated sheet.

2. A method according to claim 1 wherein the pitch of the corrugation is at least ½ inch.

3. A method according to claim 2 wherein the amplitude is from ⅛ the pitch to 3 times the pitch, and the pitch is from ½ inch to 3 inches.

4. A process according to claim 1 wherein the flat panel is adhered to the peaks by an adhesive.

5. A process according to claim 1 wherein the flat panels are adhered directly to the peaks and low points while the peaks and low points are in a tacky condition.

6. A method according to claim 1 wherein said surfacing planar sheets each consists of a foamed core having non-porous, unfoamed top and bottom skins integral with said core.

7. A method according to claim 6 wherein the planar sheets are made of the same material as the corrugated sheet.

References Cited by the Examiner

UNITED STATES PATENTS

| | | |
|---|---|---|
| 2,429,482 | 10/1947 | Munters. |
| 2,739,093 | 3/1956 | Bull _____ 156—79 |
| 2,893,877 | 7/1959 | Nickolls. |
| 2,917,217 | 12/1959 | Sisson. |
| 3,058,161 | 10/1962 | Beyer et al. |
| 3,099,518 | 7/1963 | Wetzler _____ 156—79 X |
| 3,142,599 | 7/1964 | Chavannes _____ 156—210 |
| 3,145,240 | 8/1964 | Proulx et al. |

ALEXANDER WYMAN, *Primary Examiner.*

MORRIS SUSSMAN, *Examiner.*